United States Patent
Kim et al.

(10) Patent No.: US 7,688,412 B2
(45) Date of Patent: Mar. 30, 2010

(54) MULTI-DOMAIN LIQUID CRYSTAL DISPLAY DEVICE

(75) Inventors: Kyeong Jin Kim, Kyongsangbuk-do (KR); Ki Bok Park, Kyongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/252,712

(22) Filed: Sep. 24, 2002

(65) Prior Publication Data

US 2003/0112398 A1 Jun. 19, 2003

(30) Foreign Application Priority Data

Dec. 13, 2001 (KR) .............................. 2001-78910

(51) Int. Cl.
*G02F 1/1337* (2006.01)
*G02F 1/1343* (2006.01)

(52) U.S. Cl. ........................................ 349/129; 349/139
(58) Field of Classification Search ................. 349/129, 349/139, 143
See application file for complete search history.

(56) References Cited

U.S. PATENT DOCUMENTS

| | | | |
|---|---|---|---|
| 4,691,995 A | 9/1987 | Yamazaki et al. | |
| 5,309,264 A | 5/1994 | Lien et al. | |
| 5,608,556 A | 3/1997 | Koma | |
| 5,666,179 A | 9/1997 | Koma | |
| 6,710,837 B1 * | 3/2004 | Song et al. | 349/143 |
| 6,724,452 B1 * | 4/2004 | Takeda et al. | 349/139 |
| 2001/0019388 A1 * | 9/2001 | Kim et al. | 349/129 |
| 2001/0022643 A1 * | 9/2001 | Kim et al. | 349/139 |
| 2004/0125253 A1 * | 7/2004 | Kim et al. | 349/43 |

FOREIGN PATENT DOCUMENTS

| | | | |
|---|---|---|---|
| EP | 884626 | | 12/1998 |
| GB | 2 347 779 | * | 9/2000 |
| JP | 5-297412 | * | 11/1993 |
| JP | 6235925 | | 8/1994 |
| JP | 101395 | | 4/1996 |
| JP | 9061829 | | 3/1997 |

(Continued)

OTHER PUBLICATIONS

Y. Tanaka, "Late-News Paper: A New Design to Improve Performance and Simplify the Manufacturing Process of High-Quality MVA TFT-LCD Panels", SID Digest, pp. 206-209.

*Primary Examiner*—Dung T. Nguyen
(74) *Attorney, Agent, or Firm*—McKenna Long & Aldridge LLP

(57) ABSTRACT

A multi-domain LCD device is disclosed, which includes a plurality of gate and data lines crossing one another on the first substrate, for defining a plurality of pixel regions. A pixel electrode is formed within the pixel region, the pixel electrode having an electric field induction window for dividing the pixel region into a plurality of domains. An auxiliary electrode is formed on the different layer from the pixel electrode, and beneath the edge of the pixel electrode. A common electrode is formed on a second substrate having a black matrix film and a color filter film. A circle type dielectric structure is formed on the common electrode in the plurality of domains, thereby obtaining wide viewing angle and high aperture ratio.

14 Claims, 9 Drawing Sheets

FOREIGN PATENT DOCUMENTS

| | | |
|---|---|---|
| JP | 10177178 | 6/1998 |
| JP | 10333157 | 12/1998 |
| JP | 10333159 | 12/1998 |
| JP | 11133438 | 5/1999 |
| JP | 11142864 | 5/1999 |
| JP | 11248930 | 9/1999 |
| JP | 11326922 | 11/1999 |
| KR | 1020000059783 | 10/2000 |
| WO | WO 00-08521 | 2/2000 |

* cited by examiner

MULTI-DOMAIN LIQUID CRYSTAL DISPLAY DEVICE

This application claims the benefit of the Korean Application No. P2001-78910 filed on Dec. 13, 2001, which is hereby incorporated by reference for all purposes as if fully set forth herein.

BACKGROUND OF THE INVENTION

1. Field of the Invention

The present invention relates to a liquid crystal display (LCD) device, and more particularly, to a multi-domain LCD device in which a liquid crystal is diversely driven by an auxiliary electrode.

In general, an LCD device is provided with lower and upper substrates facing each other at a predetermined distance, and a liquid crystal layer formed between the lower and upper substrates.

There are several types of LCD devices including a vertical alignment mode LCD device, which uses a negative liquid crystal of a negative dielectric anisotropy. In a state where voltage is not applied, a longitudinal direction of a liquid crystal molecule is arranged perpendicular to an alignment layer. When the voltage is applied, the longitudinal direction of the liquid crystal molecule is twisted to the alignment layer due to an electric field. In this respect, transmissivity of light is controlled in the LCD device, thereby displaying an image.

In order to obtain a wide viewing angle, the vertical alignment mode LCD device includes a side electrode and a rib/slit on the substrate. That is, the liquid crystal molecules are arranged at a desired direction by deteriorating the electric field applied to the liquid crystal layer (for example, a patterned vertical alignment (PVA) mode and a multi-domain vertical alignment (MVA) mode). The explanation for the above modes follows with reference to the accompanying drawings.

FIG. 1A is a sectional view showing a unit pixel of a related art LCD device in which a liquid crystal is driven by a auxiliary electrode.

The related art LCD device includes first and second substrates (not shown), a plurality of gate and data lines (not shown), a thin film transistor (not shown), a pixel electrode 1, a passivation film 3, a side electrode 5, a black matrix film (not shown), a color filter film 7, a common electrode 9 and a liquid crystal layer (not shown).

The plurality of gate lines are formed on the substrate to cross the plurality of data lines, thereby defining a plurality of pixel regions. Then, the thin film transistor (TFT) formed at the pixel region includes a gate electrode, a gate insulating layer, a semiconductor layer, an ohmic contact layer and source/drain electrodes. The pixel electrode 1 is formed at the pixel region to connect to the TFT, and the passivation layer 3 is formed on an entire surface of the first substrate including the pixel electrode 1. Next, the side electrode 5 is formed on the passivation layer 3 to overlap with the pixel electrode 1, and the black matrix film is formed on the second substrate to prevent light from leaking in the gate line, the data line and the TFT. Then, a color filter film 7 is formed on the black matrix film, and the common electrode having an open region 8 is formed on the color filter film. The liquid crystal layer is formed between the first and second substrates.

In the related art LCD device having the aforementioned structure, the electric field is applied to the liquid crystal layer. At this time, the electric field is deteriorated by function of the open region 8 within the common electrode 9 and the side electrode 5 around the pixel electrode 1.

Accordingly, the liquid crystal molecules are arranged in the desired direction by dielectric energy of the fringe electric field, so that the liquid crystal molecules of the unit pixel are driven in various directions, thereby obtaining multi-domain effect.

However, in order to form the side electrode 5 on the pixel electrode, it is additionally required to form the passivation film 3, to pattern the side electrode 5, and to form the open region 8 in the common electrode 9 in the related art LCD device.

Also, if the width of the open region 8 is narrow, a lot of time is spent to arrange the liquid crystal molecules stably since the electric field for dividing the pixel region into a plurality of domains is slightly deteriorated.

Accordingly, an LCD device has been proposed in Korean Application P1999-7633 filed on Apr. 9, 1999 in which the auxiliary electrode is formed on the same layer with the gate line to simplify the manufacturing process steps, and a dielectric structure is formed on the common electrode without forming the open region on the common electrode.

FIG. 1B is a sectional view showing an LCD device of the Korean Application P1999-7633 (U.S. application Ser. No. 09/327,283).

Referring to FIG. 1B, the LCD device includes first and second substrates (not shown), a plurality of gate and data lines (not shown), a pixel electrode 1, a common side electrode 5, a black matrix film (not shown), a common electrode 9, a dielectric structure 6 and a liquid crystal layer (not shown).

The plurality of gate lines are formed on the first substrate to cross the plurality of data lines, thereby defining a plurality of pixel regions. Then, the pixel electrode 1 having an electric field induction window 2 is formed in the pixel region, and the common side electrode 5 is formed on the same layer with the gate line, and is overlapped with an edge of the pixel electrode 1. After that, the passivation film 4 is formed beneath the pixel electrode 1, and the black matrix film (not shown) is formed on the second substrate. The color filter film 7 is formed on the black matrix film, and the common electrode 9 is formed on the color filter film 7. Next, the dielectric structure 6 is formed on the common electrode, and the liquid crystal layer (not shown) is formed between the first and second substrates.

However, in the aforementioned LCD device, the electric field is deteriorated and becomes unstable in regions of the dielectric structure 6 and the electric field induction window 2, so that it is difficult to obtain a stable texture, and a residual image generates on the display panel.

SUMMARY OF THE INVENTION

Accordingly, the present invention is directed to an LCD device that substantially obviates one or more problems due to limitations and disadvantages of the related art.

An advantage of the present invention is to provide a multi-domain LCD device in which a stable texture is obtained without residual images.

Another advantage of the present invention is to provide a multi-domain LCD device in which an electric field is deteriorated by a device formed in simple manufacturing process step.

Another advantage of the present invention is to provide a multi-domain LCD device in which a wide viewing angle and an aperture ratio are improved by effectively deteriorating the electric field.

Additional features and advantages of the invention will be set forth in the description which follows and in part will become apparent from the description, or may be learned by practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, a multi-domain LCD device according to the present invention includes first and second substrates; a plurality of gate and data lines crossing one another on the first substrate, for defining a plurality of pixel regions; a pixel electrode formed within the pixel region, the pixel electrode having an electric field induction window for dividing the pixel region into a plurality of domains; an auxiliary electrode on a different layer from the pixel electrode, and beneath an edge of the pixel electrode; a black matrix film on the second substrate; a color filter film on the black matrix film; a common electrode on the color filter film; a circle type dielectric structure on the common electrode in the plurality of domains; and a liquid crystal layer between the first and second substrates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1A:
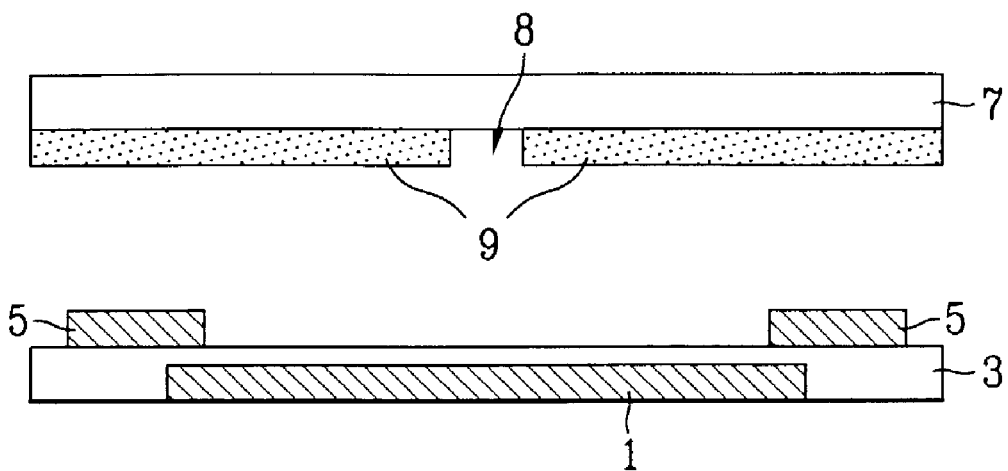
FIG. 1A and FIG. 1B are sectional views showing a related art liquid crystal display (LCD) device.
Figure 1B:
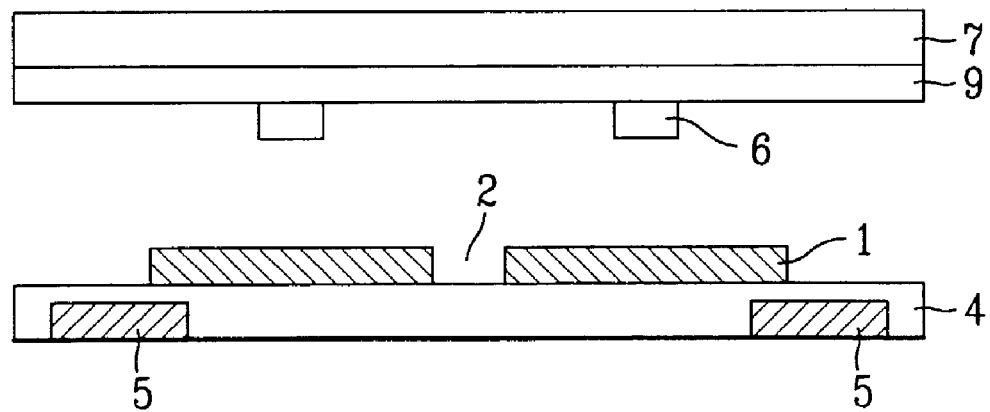

Reference will now be made in detail to embodiments of the present invention, example of which are illustrated in the accompanying drawings. Wherever possible, the same reference numbers will be used throughout the drawings to refer to the same or like parts.

First Embodiment

FIG. 2A to FIG. 2D are plan views showing various types of unit pixels of a multi-domain LCD device according to a first embodiment of the present invention. FIG. 3A is a sectional view showing a unit pixel taken along line I-I' of FIG. 2A. FIG. 3B is a sectional view showing a unit pixel taken along line II-II' of FIG. 2A.

The multi-domain liquid crystal display (LCD) device according to the first embodiment of the present invention includes first and second substrates 10 and 20, a plurality of gate and data lines 16 and 18, a pixel electrode 40, a auxiliary electrode 30a and 30, a black matrix film 22, a common electrode 26, a dielectric structure 50 and a liquid crystal layer (not shown).

At this time, the plurality of gate lines 16 are formed on the first substrate 10 to cross the plurality of data lines 18, thereby defining a plurality of pixel regions. Then, a gate insulating film 12 is formed on an entire surface of the first substrate including the gate line 16, and a passivation film 14 is formed on the entire surface of the first substrate including the data line 18. Subsequently, the pixel electrode 40 formed in the pixel region has an electric field induction window 42 for dividing the pixel region into multi-domains. The auxiliary electrode 30a and 30 is formed on the same layer with the gate line 16, and is overlapped with the edge of the pixel electrode and the electric field induction window 42.

Next, the black matrix film is formed on the second substrate 20, the color filter film 24 is formed on the black matrix film 22, and the common electrode 26 is formed on the color filter film 24. Also, the dielectric structure 50 is formed in a circle shape at each domain region, and is formed on the common electrode 26. The liquid crystal layer (not shown) is formed between the first and second substrates 10 and 20.

That is, the LCD device according to the first embodiment of the present invention is characterized by the pixel electrode 40 having various types of electric field induction windows 42 for dividing the pixel region into a plurality of domains, the auxiliary electrodes 30a and 30 are formed on the same layer with the gate line 16 and are overlapped with an edge of the pixel electrode, and the circle type dielectric structure 50 formed within each domain.

As shown in FIG. 2A to FIG. 2D, the various types of electric field induction windows 42 are formed within the pixel electrode 40. However, the type of electric field induction window 42 is not limited to the types shown in the above FIG. 2A to FIG. 2D. That is, it is possible to vary the type of electric field induction window by several methods. As the number of electric field induction windows 42 is increased, a characteristic such as response time and driving voltage is improved, meanwhile, an aperture ratio is deteriorated, so that it is required to appropriately control the number of the electric field induction windows. The pixel electrode 40 may be formed of indium tin oxide (ITO) or indium zinc oxide (IZO).

At this time, an additional storage electrode is not required since the auxiliary electrodes 30a, 30 are overlapped with the pixel electrode 40. However, the additional storage electrode (not shown) may be formed beneath the pixel electrode 40 for being connected with the pixel electrode 40 so as to improve storage capacitance.

Accordingly, it is possible to form the storage electrode for forming the storage capacitance with the gate line 16, or to form the storage electrode for forming the storage capacitance with the gate line 16 and the auxiliary electrodes 30a and 30.

The auxiliary electrodes 30a and 30 may be formed of any one of indium tin oxide (ITO), aluminum (Al), molybdenum (Mo), chromium (Cr), tantalum (Ta), titanium (Ti) or Al alloy. The auxiliary electrodes are formed of the same material as the gate line 16, or may be formed of a different material from the gate line 16 with an additional mask. Also, the auxiliary electrodes are electrically connected with the common electrode 26 and simultaneously generate an electric field with the pixel electrode 40 so that it is possible to effectively drive the liquid crystal formed at the edge between the domains.

The dielectric structure 50 has to correspond to the respective domains divided by the electric field induction window 42. In this respect, the plurality of dielectric structures 50 are formed. A dielectric constant of the dielectric structure is same as that of the liquid crystal layer or below. The dielectric constant of the dielectric structure may be 3 or below, and the dielectric structure may be formed of acryl resin or BenzoCycloButene (BCB).

The dielectric structure 50 is formed to stabilize a texture in each domain.

Although not shown, a thin film transistor (TFT) is formed at a crossing point of the gate and data lines 16 and 18. At this time, the TFT includes a gate electrode, a source electrode, and a drain electrode respectively connected with the gate line 16, the data line 18 and the pixel electrode 40.

At this time, the liquid crystal has negative dielectric anisotropy. That is, the liquid crystal is formed by mixing a vertical alignment liquid crystal with chiral dopant so as to sequentially form alignment and optic axis of the liquid crystal by applying the electric field.

The black matrix film 22 prevents light from leaking in regions of the gate line 16, the data line 18 and the TFT, and is overlapped with the auxiliary electrode 30. That is, the auxiliary electrode 30 is overlapped with the pixel electrode 40, so that it is not required to overlap the black matrix film 22 with the pixel electrode 40, thereby improving aperture ratio.

The common electrode 26 may be formed of ITO.

The passivation film 14 may be formed of any one of BenzoCylcoButene (BCB), acryl resin, polyamide compound, silicon nitride (SiNx) or silicon oxide (SiOx).

Also, it is possible to form the gate insulating film 12 of the same material with the passivation film 14 or to form the gate insulating film 12 with SiNx or SiOx.

Additionally, the gate line 16, the data line 18 and the color filter film 24 may be modified and varied.

Although not shown, an alignment film may be formed on an entire surface of any one of the first and second substrates 10 and 20.

The alignment film is formed any of polyamide, polyimide compound, polyvinylalcohol (PVA) and polyamic acid with rubbing, or without rubbing.

Also, the alignment film is formed any material having photoreaction such as polyvinylcinnamate (PVCN), polysiloxanecinnamate (PSCN) or cellulosecinnamate (CelCN) with alignment-treatment, or without alignment-treatment.

Pretilt angle and alignment direction are simultaneously determined by a photo alignment process step which may be repeated and by using ultraviolet rays of any one of non-polarized light, un-polarized light, linearly polarized light or partially polarized light.

Also, a phase difference film may be formed on at least any one of the first and second substrates 10, 20. The phase difference film compensates a viewing angle in directions perpendicular to the substrate or varied with the viewing angle, thereby enlarging regions having no gray inversion, and improving contrast ratio.

The phase difference film may be formed of negative uniaxial film having one optic axis, or negative biaxial film having at least two optic axes. However, the phase difference film may be formed as the negative biaxial film so as to obtain wide viewing angle.

Also, polarizers (not shown) are attached to the first and second substrates 10 and 20, and may be formed in one body of the phase film.

Second Embodiment

Figure 2A:
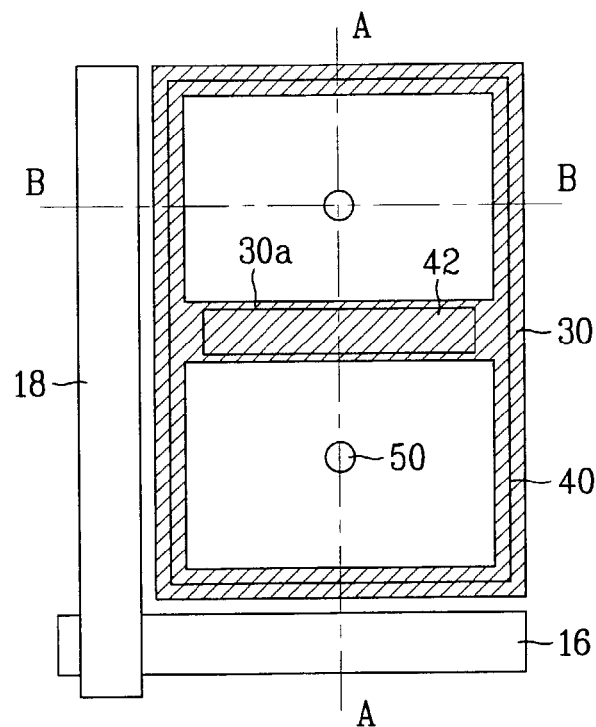
FIG. 2A to FIG. 2D are plan views showing various types of unit pixels in a multi-domain LCD device according to an embodiment of the present invention.
Figure 2B:
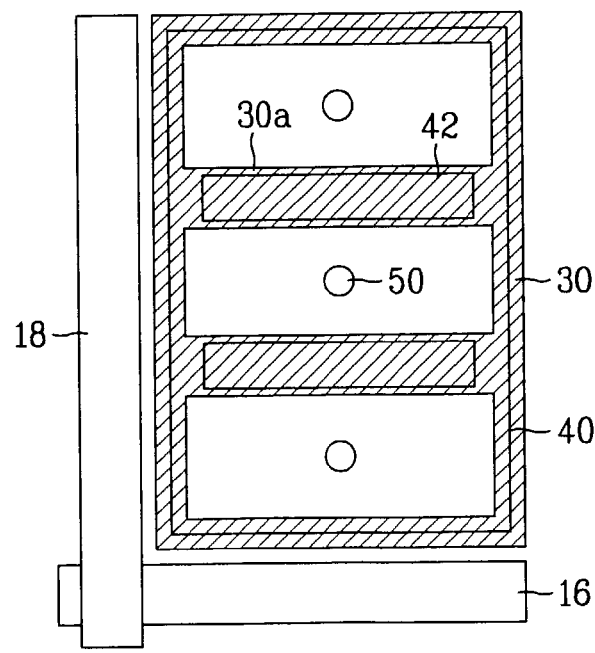
Figure 2C:
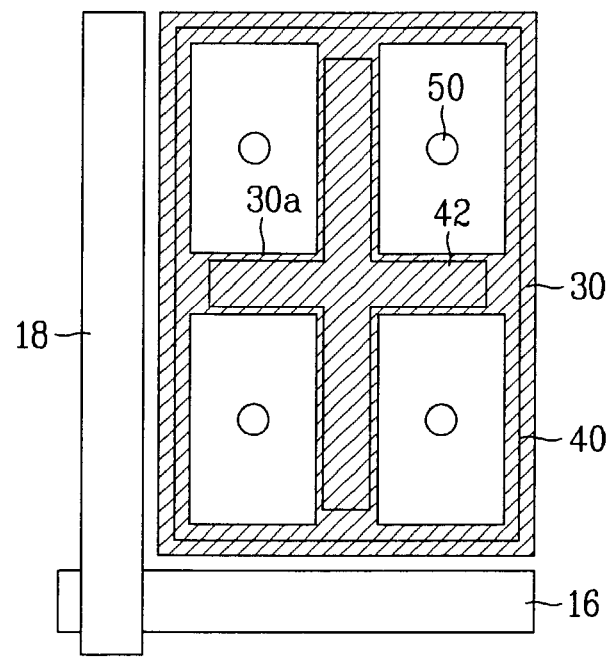
Figure 2D:
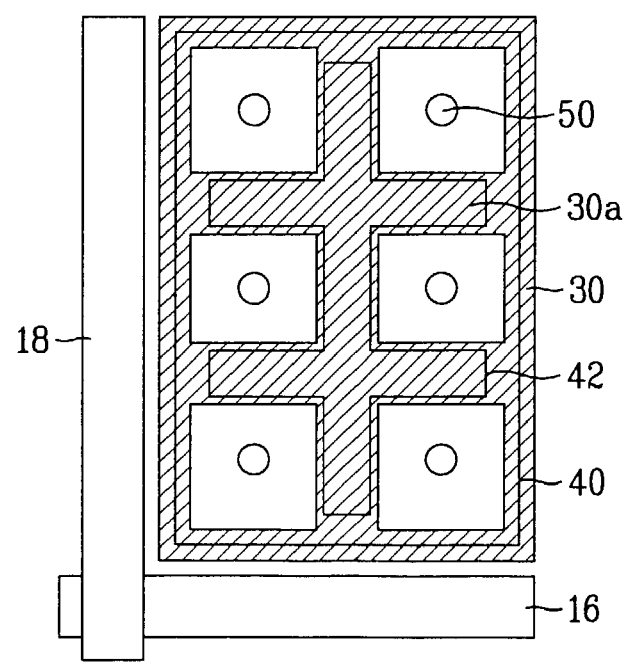
Figure 3A:
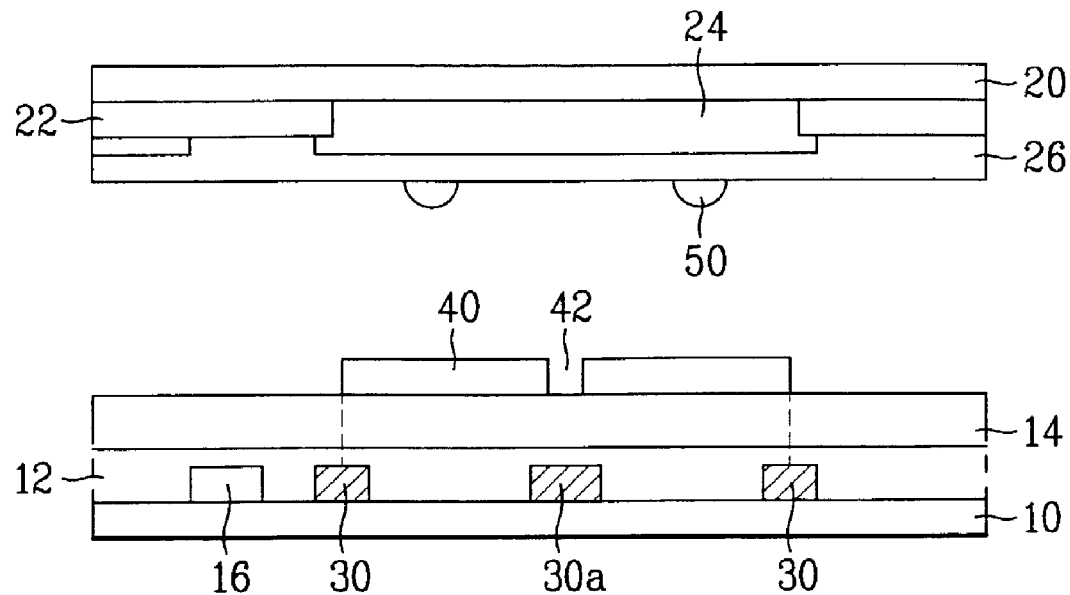
FIG. 3A and FIG. 3B are sectional views taken along lines I-I' and II-II' of FIG. 2A according to an embodiment of the present invention.
Figure 3B:
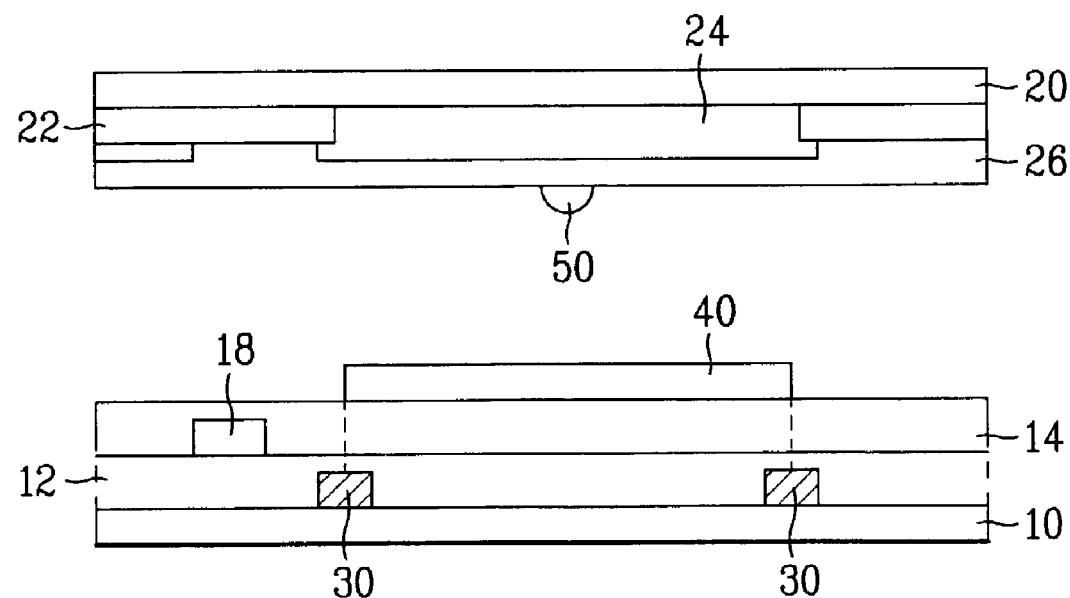
Figure 4A:
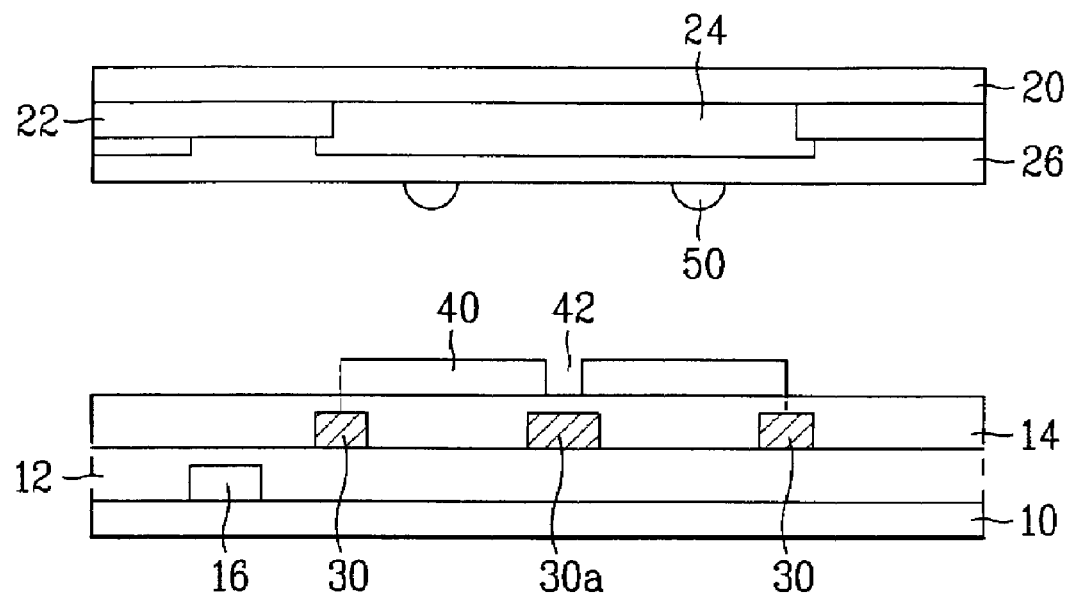
FIG. 4A and FIG. 4B are sectional views taken along lines I-I' and II-II' of FIG. 2A according to another embodiment of the present invention.
Figure 4B:
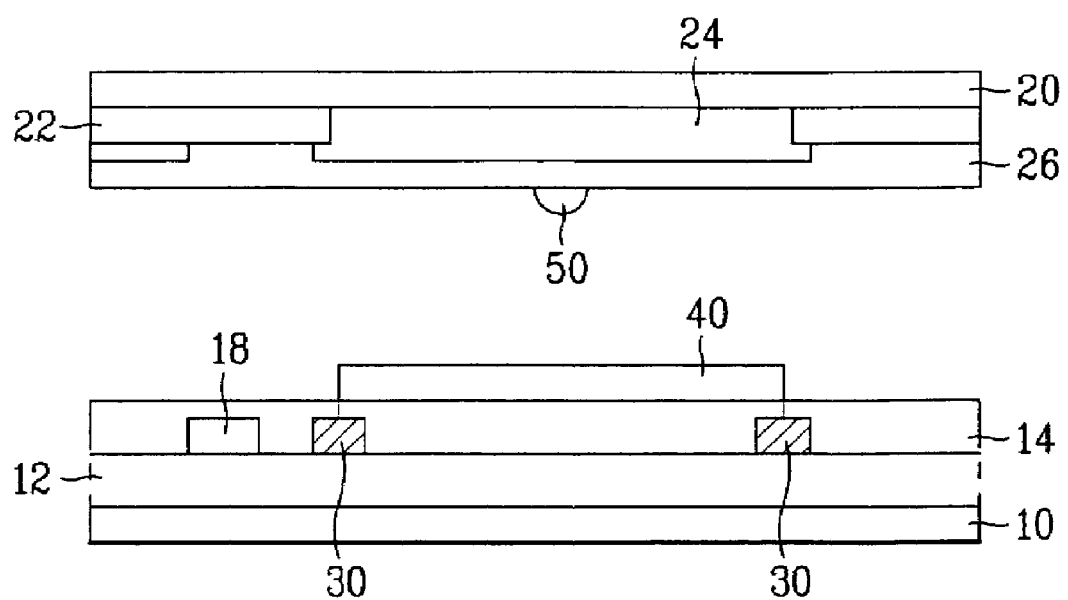

FIG. 4A is a sectional view showing a unit pixel of an LCD device taken along line III-III' of FIG. 2A. FIG. 4B is a sectional view showing a unit pixel of a multi-domain LCD device taken along line IV-IV' according to a second embodiment of the present invention.

The LCD device according to the second embodiment of the present invention includes first and second substrates 10 and 20, a plurality of gate and data lines 16 and 18, a gate insulating film 12, a passivation film 14, a pixel electrode 40, a auxiliary electrode 30a and 30, a black matrix film 22, a color filter film 24, a common electrode 26, a dielectric structure 50 and a liquid crystal layer (not shown).

At this time, the plurality of gate lines 16 are formed on the first substrate 10 to cross the plurality of data lines 18, thereby defining a plurality of pixels. Then, the gate insulating film 12 is formed on an entire surface of the first substrate including the gate lines 16, and the passivation film 14 is formed on the entire surface of the first substrate including the data lines 18. The pixel electrode having an electric field induction window 42 is formed within the pixel region to divide the pixel region into a plurality of domains. Also, the auxiliary electrodes 30 and 30a are formed on the same layer with the data lines 18, and are overlapped with an edge of the pixel electrode and the electric field induction window 42.

Next, the black matrix film 22 is formed on the second substrate 20, and the color filter film 24 is formed on the black matrix film 22. Subsequently, the common electrode 26 is formed on the color filter film 24, and the circle type dielectric structures are respectively formed on the common electrode 26 in the plurality domain regions, and the liquid crystal layer (not shown) is formed between the first and second substrates 10 and 20.

The LCD device according to the second embodiment of the present invention is characterized by the pixel electrode 40 having various types of electric field induction windows for dividing the pixel region into a plurality of domains, the auxiliary electrodes 30a and 30 formed on the same layer with the data line 18 and are overlapped with an edge of the pixel electrode, and the circle type dielectric structure 50 formed in the divided domains.

The LCD device according to the second embodiment of the present invention is same as the LCD device according to the first embodiment of the present invention except that the auxiliary electrodes 30a and 30 are not formed on the same layer with the gate line 16, but are formed on the same layer with the data line 18. Accordingly, reference numerals of the LCD device according to the second embodiment of the present invention are same as those of the LCD device according to the first embodiment of the present invention.

Third Embodiment

FIG. 5A to FIG. 5D are plan views showing various types of unit pixels in a multi-domain LCD device according to a third embodiment of the present invention. FIG. 6A is a sectional view showing a unit pixel taken along line III-III' of FIG. 5A. FIG. 6B is a sectional view showing a unit pixel taken along line IV-IV' of FIG. 5A.

The LCD device according to the third embodiment of the present invention includes first and second substrates 10 and 20, a plurality of gate and data lines 16 and 18, a gate insulating film 12, a pixel electrode 40, a auxiliary electrode 30a and 30, a black matrix film 22, a color filter film 24, a common electrode 26, a dielectric structure 50 and a liquid crystal layer (not shown).

At this time, the plurality of gate lines 16 are formed on the first substrate 10 to cross the plurality of data lines 18. Then, the gate insulating film 12 is formed on an entire surface of the first substrate including the gate lines 16, and the passivation film 14 is formed on the entire surface of the first substrate including the data lines 18. After that, the pixel electrode 40 is formed at the pixel region. At this time, the pixel electrode has an electric field induction window 42 dividing the pixel region into a plurality of domains. Then, the auxiliary electrodes 30a and 30 are overlapped with the electric field induction window 42, but the auxiliary electrodes are not overlapped with the edge of the pixel electrode. At this time, the auxiliary electrode is formed on the same layer with the gate line 16.

Next, the black matrix film 22 is formed on the second substrate 20, and the color filter film 24 is formed on the black matrix film 22. Then, the common electrode 26 is formed on the color filter film 24, and the circle type dielectric structures 50 are formed on the common electrodes 26 in the plurality of domain regions. Then, the liquid crystal layer (not shown) is formed between the fist and second substrates 10 and 20.

The LCD device according to the third embodiment of the present invention is characterized by the pixel electrode 40 having various types of electric field induction windows 42 for dividing the pixel region into a plurality of domains, the auxiliary electrodes 30a and 30 formed on the same layer with the gate line and are not overlapped with an edge of the pixel electrode, and the circle type dielectric structure 50 are formed in the divided domains.

In the LCD device according to the third embodiment of the present invention, the auxiliary electrodes 30a and 30 are not overlapped with an edge of the pixel electrode 40. In this respect, an additional storage electrode connected with the pixel electrode 40 is formed beneath the pixel electrode 40. That is, a storage capacitor is formed with the gate line 16, or the gate line 16 and the auxiliary electrodes 30a and 30.

Also, the auxiliary electrode 30 is not overlapped with an edge of the pixel electrode 40, so that the black matrix film 22 is formed to overlap with the pixel electrode 40.

Also, it is possible to remove the gate insulating film 12 and the passivation film 14 on the auxiliary electrode 30, so that the electric field applied to the auxiliary electrode 30 is strengthened. That is, the same effect can be accomplished by forming the auxiliary electrode 30 on the same layer with the pixel electrode 40.

The other structure of the LCD device according to the third embodiment of the present invention is same as that of the LCD device according to the first embodiment of the present invention, so that reference numerals in the LCD device according to the third embodiment of the present invention are same as those of the LCD device according to the first embodiment of the present invention.

Fourth Embodiment

Figure 5A:
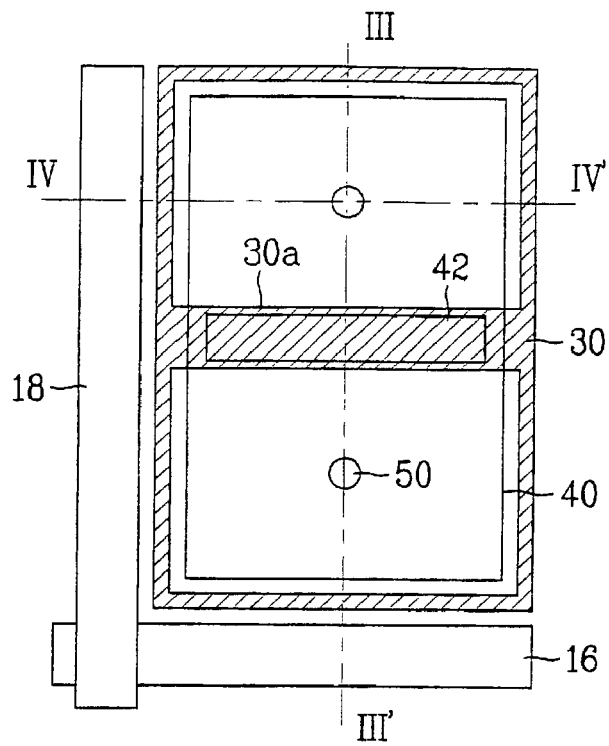
FIG. 5A to FIG. 5D are plan views showing various types of unit pixels in a multi-domain LCD device according to another embodiment of the present invention.
Figure 5B:
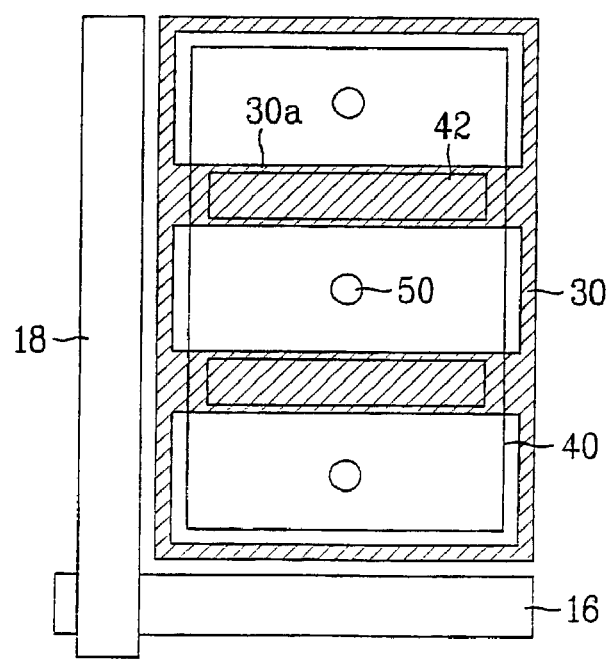
Figure 5C:
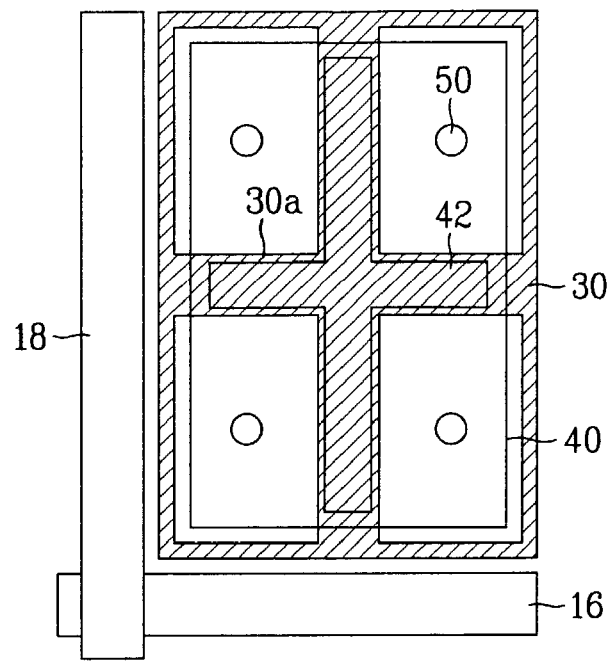
Figure 5D:
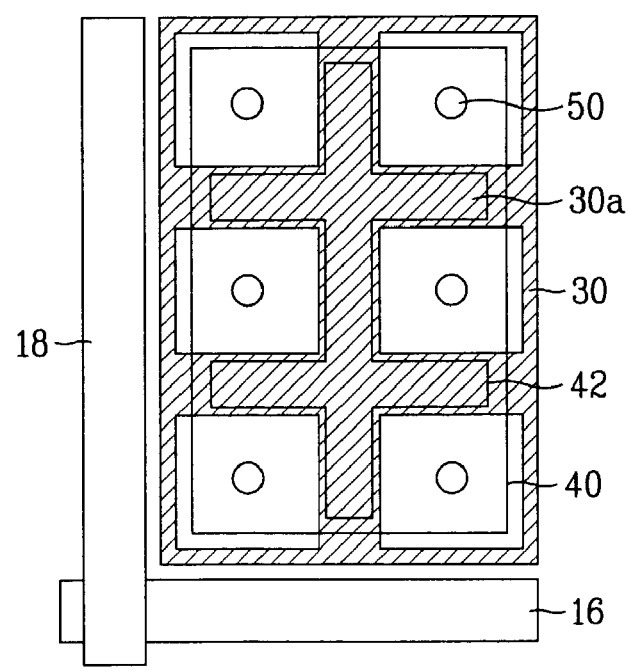
Figure 6A:
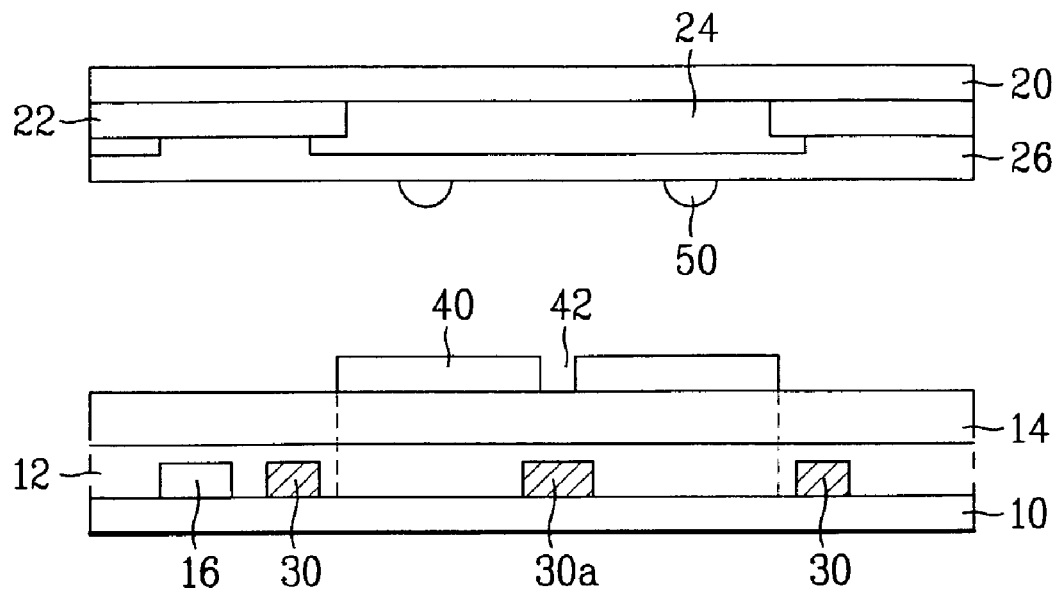
FIG. 6A and FIG. 6B are sectional views taken along lines III-III' and IV-IV' of FIG. 5A according to another embodiment of the present invention.
Figure 6B:
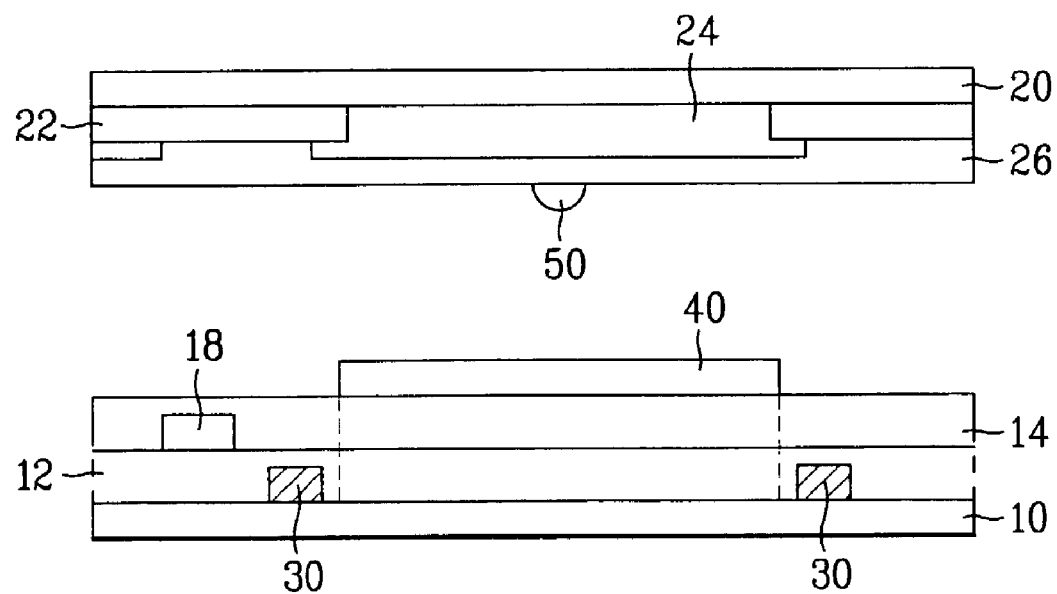
Figure 7A:
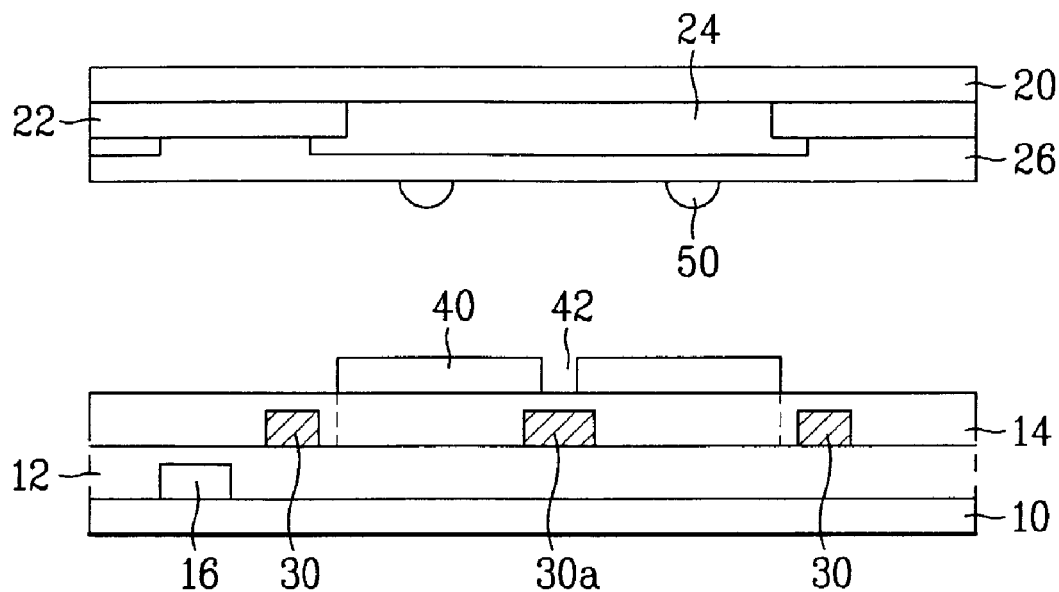
FIG. 7A and FIG. 7B are sectional views taken along lines III-III' and IV-IV' of FIG. 5A according to another embodiment of the present invention.
Figure 7B:
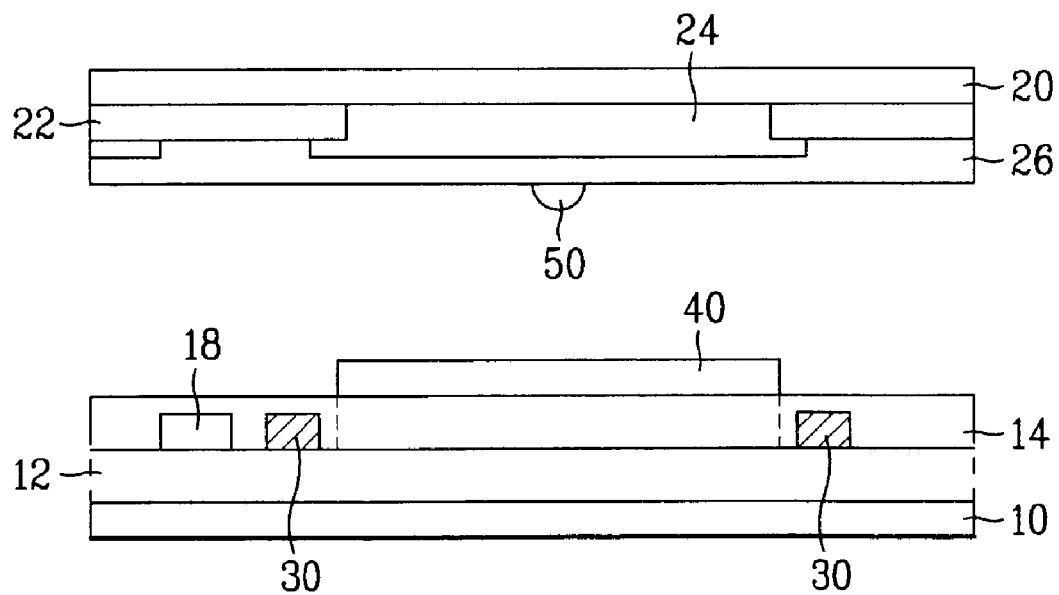

FIG. 7A is a sectional view showing a unit pixel of an LCD device taken along line III-III' of FIG. 5A. FIG. 7B is a plan view showing a unit pixel in a multi-domain LCD device according to the fourth embodiment of the present invention.

The LCD device according to the fourth embodiment of the present invention includes first and second substrates 10 and 20, a plurality of gate and data lines 16 and 18, a pixel electrode 40, a auxiliary electrode 30a and 30, a black matrix film 22, a color filter film 24, a common electrode 26, a dielectric structure 50 and a liquid crystal layer (not shown).

At this time, the plurality of gate lines are formed on the first substrate to cross the plurality of data lines, thereby defining a plurality of pixel regions. Then, a gate insulating film 12 is formed on an entire surface of the first substrate including the gate line 16, and the passivation film 14 is formed on the entire surface of the first substrate including the data line 18. After that, the pixel electrode 40 is formed at the pixel region. At this time, the pixel electrode has an electric field induction window 42 for dividing the pixel region into a plurality of domains. Subsequently, the auxiliary electrodes 30a and 30 are formed on the same layer with the data line. Also, the auxiliary electrode is overlapped with the electric field induction window 42, and is formed around the pixel electrode to not overlap with the edge of the pixel electrode.

Next, the black matrix film 22 is formed on the second substrate 20, and the color filter film 24 is formed on the black matrix film 22. Then, the common electrode is formed on the color filter film 24, and the circle type dielectric structure 50 is formed in the plurality of domains. The liquid crystal layer (not shown) is formed between the first and second substrates 10, 20.

The LCD device according to the fourth embodiment of the present invention is characterized by the pixel electrode having various types of electric field induction windows for dividing the pixel region into the plurality of domains, the auxiliary electrodes 30a and 30 formed on the same layer with the data line 18 and formed around the pixel electrode to not overlap with the edge of the pixel electrode, and the circle type dielectric structure formed in the plurality of domains.

The LCD device according to the fourth embodiment of the present invention is same as the LCD device according to the third embodiment of the present invention except that the auxiliary electrodes 30a and 30 are formed on the same layer as the data line 18, so that reference numerals in the LCD device according to the fourth embodiment of the present invention are same with those of the LCD device according to the third embodiment of the present invention.

As mentioned above, the multi-domain LCD device according to the present invention has the following advantages.

In the multi-domain LCD device according to the present invention, the plurality of electric field induction windows are formed within the pixel electrode, simultaneously, the auxiliary electrodes are formed beneath the edge of the pixel electrode and the electric field induction windows. Also, the circle type dielectric structure is formed on the common electrode. In this respect, it is possible to obtain a stable texture, and to prevent residual image from generating.

Also, a wide viewing angle can be obtained with various types of multi-domains.

The auxiliary electrodes are formed on the same layer as the gate and data lines, so that it is possible to prevent the pixel electrode from being shorted by the auxiliary electrode, thereby simplifying manufacturing process steps and improving yield.

If the auxiliary electrode is overlapped with the pixel electrode, an additional storage electrode is not required, thereby improving aperture ratio with simple process steps.

Furthermore, the vertical alignment liquid crystal including chiral dopant is used in the present invention, so that it is possible to sequentially form the alignment and optic axis of the liquid crystal molecules, thereby obtaining stable mode in the multi-domain LCD device.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A multi-domain LCD device comprising:
   first and second substrates;
   a plurality of gate and data lines crossing one another on the first substrate, for defining a plurality of pixel regions;
   a pixel electrode formed within a pixel region of the plurality of pixel regions, the pixel electrode having an electric field induction window that divides the pixel region into a plurality of domains;
   auxiliary electrodes, which are formed on a same layer as the gate line, including a first auxiliary electrode overlapping with an edge of the pixel electrode to completely surround the pixel electrode and a second auxiliary electrode overlapping the electric field induction window;
   a black matrix film formed only in regions of the gate line, the data line and a TFT on the second substrate;
   a color filter film on the black matrix film;
   a common electrode on the color filter film;
   a circle type dielectric structure on the common electrode in the plurality of domains; and
   a liquid crystal layer between the first and second substrates,
   wherein the auxiliary electrodes are formed in at least two of close loop type within pixel region and formed on a different layer from the pixel electrode, and
   wherein the first auxiliary electrode and the second auxiliary electrode are formed as one body and electrically connected with the common electrode,
   wherein the second auxiliary electrodes between the plurality of domains are formed along the electric field induction window and formed as a cross pattern.

2. The multi-domain LCD device as claimed in claim 1, wherein the first auxiliary electrode is overlapped with the black matrix film.

3. The multi-domain LCD device as claimed in claim 1, further comprising a storage electrode beneath the pixel electrode.

4. The multi-domain LCD device as claimed in claim 1, wherein the liquid crystal layer has a negative dielectric anisotropy.

5. The multi-domain LCD device as claimed in claim 4, wherein the liquid crystal layer has a chiral dopant.

6. The multi-domain LCD device as claimed in claim 1, wherein a thin film transistor is formed at a crossing point of the gate and data lines.

7. The multi-domain LCD device as claimed in claim 1, wherein the auxiliary electrodes are formed of any one of indium tin oxide (ITO), Al, Mo, Ta, Ti or Al alloy.

8. The multi-domain LCD device as claimed in claim 1, wherein a dielectric constant of the dielectric structure is smaller than that of the liquid crystal layer.

9. The multi-domain LCD device as claimed in claim 1, wherein the dielectric structure includes photosensitive material.

10. The multi-domain LCD device as claimed in claim 9, wherein the dielectric structure includes photoacrylate or BenzoCycloButene (BCB).

11. The multi-domain LCD device as claimed in claim 1, further comprising an alignment film on at least any one of the first and second substrates.

12. The multi-domain LCD device as claimed in claim 11, wherein the alignment film is rubbed or aligned by photo-alignment.

13. The multi-domain LCD device as claimed in claim 11, wherein the alignment film is not aligned.

14. The multi-domain LCD device as claimed in claim 1, further comprising a phase difference film on at least any one of the first and second substrates.

* * * * *